June 14, 1955  L. KOLOS  2,710,623
PNEUMATIC VALVE FOR INFLATABLE MEMBERS
Filed Jan. 17, 1952  2 Sheets-Sheet 1

INVENTOR.
LAJOS KOLOS
BY
Robert H. Jacob
AGENT

INVENTOR.
LAJOS KOLOS

United States Patent Office 2,710,623
Patented June 14, 1955

2,710,623

PNEUMATIC VALVE FOR INFLATABLE MEMBERS

Lajos Kolos, Budapest, Hungary, assignor to "Licencia" Találmányokat Értékesitö Vállalat, Budapest, Hungary, a Hungarian national enterprise Application January 17, 1952, Serial No. 266,921

Claims priority, application Hungary July 4, 1951

6 Claims. (Cl. 137—223)

This invention concerns improvements in and relating to pneumatic valves, more particularly for inflatable members, such as the bladders of sportsballs, the inner tubes of vehicle tires, and the like, said valves being formed entirely of a resilient material such as rubber or a similar elastically yielding composition.

It has already been suggested to apply what may be called all rubber valves for the inflatable members of pneumatic articles. The advantages of such valves are quite obvious and are mainly due to the elimination of metallic construction parts such as metal valve stems or the like. However, the all rubber valves hitherto known mainly consist of a plurality of different parts by which their use is rendered both cumbersome and unreliable. So far integral rubber valves have been proposed, the requirements as to precluding leakages have not sufficiently been met. Especially none of the known proposals turned out to be adapted for the usage in connection with the inflatable members of vehicle tires.

The main object of the present invention is to provide a reliable valve for inflatable members, the valve being formed entirely of a resilient material as an integral body. According to the main feature of the invention this is achieved in that the integral body has a longitudinal medial portion, an outer flange and an inner flange provided at the ends of said medial portion, respectively, and forming a recess therewith for receiving a reinforcement, and a longitudinal air channel extending throughout the valve and formed by two contiguous flat slits each arranged in a different plane and narrowing towards the other within said medial portion, the planes enclosing an angle greater than 0°. By such an arrangement a manifold check valve effect is attained so that filling air may enter an air chamber of the inflatable member, a back flow of air will, however, be automatically prevented whenever the introducing pressure of air drops or ceases in the supply conduits.

According to a further feature of the invention each of the two slits narrows down to a point and contacts the other at said point forming a pointlike passage with an increased sealing effect.

According to another feature of the invention an annular reinforcement made of resilient material is accommodated within the recess, the slits contacting with each other at the level of the annular reinforcement. Thus the valve material is substantially relieved from taking up deforming forces when air or an inflating or deflating tool is passed through the air channel whereby a considerable increase of life time may be attained.

According to a still further feature of the invention the medial portion of the valve is formed tapering towards the outer flange. Thus a self adjustment of the bulk of the valve within an aperture takes place whereby the aperture will completely be closed when the inflatable member is filled with air and there is an outward push acting on the valve body.

According to still another feature of the invention a stud is formed integral with the outer flange for serving as a valve stem by which the assembly of the pneumatic article is rendered easier.

According to a still further feature of the invention this stud has an outwardly tapering form so as to provide for self adjustment of the valve stem in an aperture through which it may pass.

According to another feature of the invention a bulge is formed integral with the inner flange for pressing the adjacent part of the medial portion of the valve when inflation of the inflatable member takes place whereby an additional sealing effect can be provided for.

According to still another feature of the invention a flanged stud is made integral with the inner flange and forms a recess therewith for receiving an edge of the inflatable member whereby a further additional sealing effect may be attained.

Other objects of the present invention will appear from the following detailed description of preferred embodiments taken by way of example referring thereby to the accompanying drawings in which.

Like reference numerals designate like parts of construction throughout the drawings.

Figure 1:
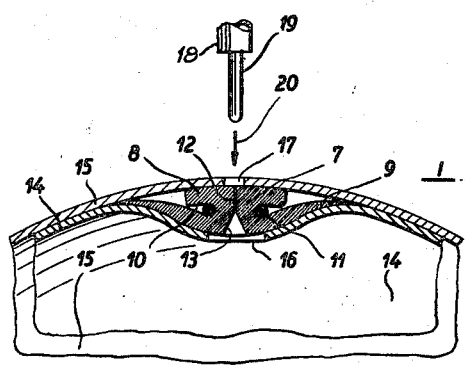
Fig. 1 is a sectional view of a preferred embodiment of the invention taken along the line I—I of Fig. 2.
Figure 2:
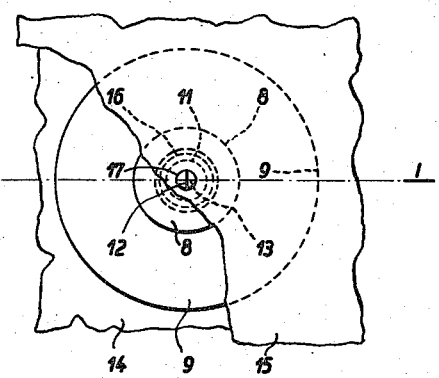
Fig. 2 is a plan view of the assembly shown in Fig. 1.
Figure 3:
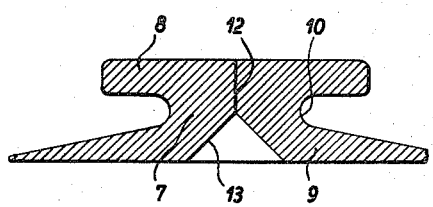
Fig. 3 is a cross-sectional view to an enlarged scale of the valve member shown in Fig. 1 showing one side of the lower slit.
Figure 4:
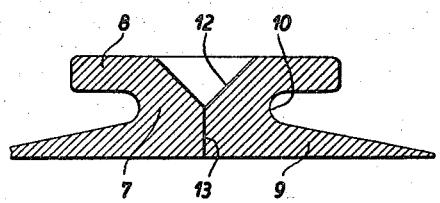
Fig. 4 is a view of the same member taken at an angle of 90° from that shown in Fig. 3 showing one side of the upper slit.
Figure 5:
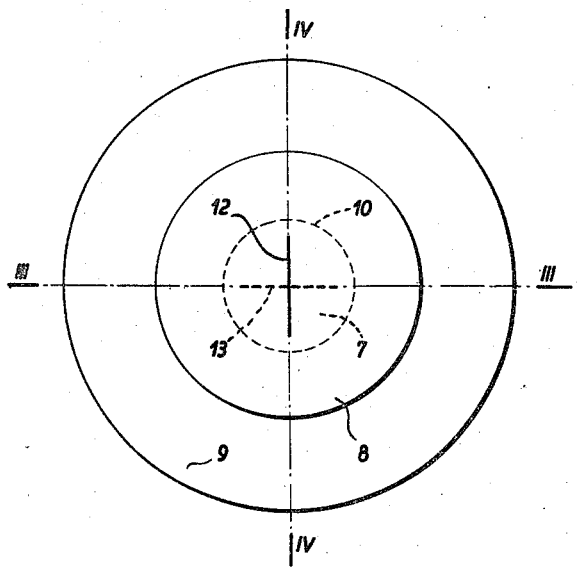
Fig. 5 is a plan view of the valve member, showing the relative positions of the slits.

Referring to the drawings Figs. 1 to 4 show a sportsball assembly comprising a valve embodying the invention. The valve is constituted by an integral body made entirely of a resilient material such as rubber. This integral body has a longitudinal medial portion 7 at the ends of which an outer flange 8 and an inner flange 9 are provided. As shown in the drawing, parts 7 to 9 are co-axially arranged and the medial portion 7 is formed cylindrical whereas flanges 8 and 9 have an annular form, outer flange 8 being of smaller diameter than the inner flange 9. Between flanges 8 and 9 there is a recess 10 for receiving a reinforcement which is, in case of the represented embodiment, constituted by a ring 11 made of a resistant material such as metal. In the axis of the integral valve body a longitudinal air channel extends throughout flange 8, medial portion 7 and flange 9, this channel being formed by two contiguous flat slits 12 and 13 which are narrowing towards and contacting each other at their points within the medial portion 7 at the level of ring 11. The planes of the slits 12 and 13 enclose an angle greater than 0°. In the embodiment illustrated in Figs. 1 and 2 this angle amounts to 90°. Thus slit 13 is indicated as a plane while slit 12 is a line indicating a plane. Reference numeral 14 designates the inflatable member or the bladder of the sportsball whereas its cover is denoted by reference numeral 15. The valve is secured to the bladder 14 by means of its flange 9 which is connected on the outer face of bladder 14 around and covering a perforation 16 thereof. A corresponding perforation of cover 14 is referred to by reference numeral 17.

After ring 11 has been accommodated in recess 10 and the valve has been connected to bladder 14 as described above, the latter will be placed into its cover in such a mutual position of cover, valve and bladder, that perforations 16 and 17 and air channel sections 12 and 13 be registering with one another. In order to inflate or deflate the bladder 14 a suitable tool 18 well known in the art is applied which is adapted to be connected to pressure air supplying means such as a hand operated pump or a pressure air line. Tool 18 is provided with a rigid tubular portion 19 which can be inserted through perforation 17 into slit 12 and further through slit 13 and perforation 16 into the air chamber of bladder 14, respectively, accordingly as inflation or deflation of the bladder 14 is aimed at.

Figure 6:
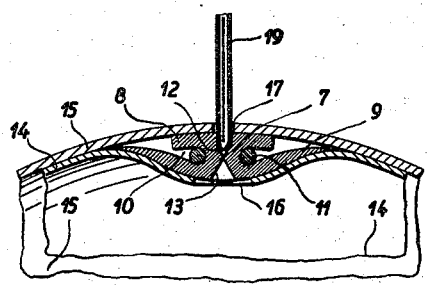
Figs. 6 and 7 show the insertion of an implement for inflation and deflation, respectively.

The preliminary mutual position of tool 18 and the sportsball assembly is shown in Fig. 1. For the purposes of inflation tool 18 is thrust downwards as indicated by arrows 20 in Fig. 1 till its rounded point intrudes into upper slit 12 and its further downward motion is momentarily stopped by the reduced cross section of the air channel as shown in Fig. 6. In this position pumping can take place. The pumped in air will fill the small conical chamber in front of the rounded point of portion 19 and after a suitable increase of pressure the air opens the pointlike passage of the valve and the lower slit 13 of the air channel and becomes discharged into the chamber of bladder 14. When, on the contrary, the pressure suitably decreases in the chamber above the pointlike passage, the latter and the lower slit 13 in the air channel becomes closed again. Thus, the tubular portion 19 of the tool 18 can be withdrawn from upper slit 12 without causing a back flow of air thereby. With progressing withdrawal the upper slit 12 will be closed as well since the valve is caused by its resilience to take in its undistorted normal form.

Figure 7:
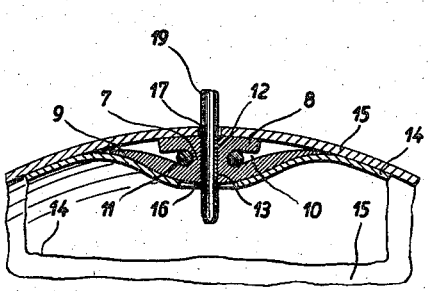

When deflating the bladder 14 the first steps of the method applied are the same as before. However, the tubular portion 19 is forced through the pointlike passage of the valve so as to protrude with its rounded point into the chamber of the inflated bladder 14, as it is shown in Fig. 7. Then the air, the pressure of which exceeds the atmospheric one, returns through the tubular portion 19 and tool 18 through a supply inlet of the latter into the atmosphere whereafter the tubular portion 19 is withdrawn from the air channel.

Obviously, this method of deflating the bladder 14 might as well be employed for inflating the same if there is a pressure air supply of the continuously working type. Even in this case a back flow of air is precluded since first lower slit 13, then pointlike passage of the valve, finally upper slit 12, become immediately closed with proceeding withdrawal of the tubular portion 19. However, such an inflating method subjects the material of the valve body to unnecessary stresses so that the first mentioned method is to be preferred for filling purposes.

The ring 11 may be arranged in recess 10 or it may be formed by a strained elastic member in which case it assists to close the air channel 12 and 13 by an additional force acting at the level of the most reduced cross section thereof. Or the reinforcement might be formed by the edge of the perforation 16 in the inflatable member which must suitably be sized and stretched prior to accommodation within recess 10. During such stretching operation the thickness of the bladder edge is reduced. When, therefore, it again contracts into place within the recess 10 of the valve body, both a contracting action and a pressing action of the bladder edge against the faces of the recess 10 take place, with a consequent improvement of the sealing action.

It is clear from the above that the valve embodying the invention provides a plurality of means with sealing action, though the valve proper consists of but one integral body. This manifold sealing effect remains even if the features of the invention are reduced to the indispensable ones.

Figure 8:
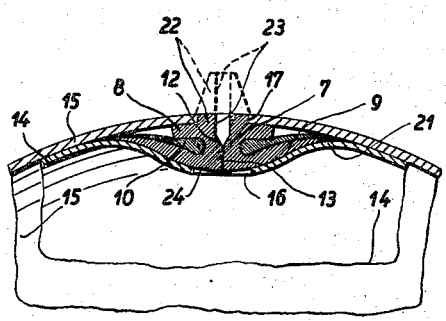
Fig. 8 is a sectional view of another embodiment of the invention.

Fig. 8 shows an embodiment of the invention wherein the reinforcement within the recess 10 is formed by an annular protection patch 21 made of leather and applied for fixing the bladder 14 in a manner well known in the art.

The outer flange 8 of the valve has a stud 22 formed integral therewith. This stud 22 tapers outwardly so that it snugly fits into perforation 17 of the cover 15 and readjusts itself whenever necessary, e. g. in case of beginning exhaustion of the rubber material. The resilience of the latter causes the stud 22 to slightly overlap the edge of perforation 17 which is demonstrated in the drawing with some exaggeration. Within the stud 22 the air channel is formed by a flat continuation 23 of upper slit 12 of constant cross section adapted to guide the tubular portion 19 of a tool 18 into upper slit 12 above the pointlike passage of the valve. Thus, the stud 22 serves as a valve stem the protruding portion of which can be trimmed off into flush relationship with the outer face of cover 15 as indicated by dotted lines in the drawing. Thus, a completely smooth surfaced and closed cover can be attained.

The inner flange 9 is provided with a bulge 24 formed integral therewith. As shown in the drawing, bulge 24 presses against the adjacent material of the medial portion 7 of the valve thereby producing an additional sealing effect when inflation of bladder 14 takes place. Otherwise this embodiment is similar to the previously described one and also its working takes place in a like manner.

Figure 9:
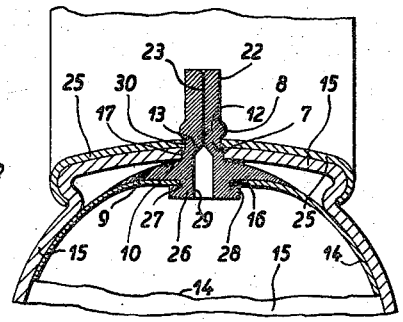
Fig. 9 is a like sectional view of a third embodiment of the invention.

Fig. 9 shows a further advantageous embodiment of the invention, particularly adapted for use in pneumatic tires of vehicles, such as cycles, motor cycles and cars.

The valve proper differs from the previous one in that its upper flange is reduced to a sturdy shoulder 8 above which the stud 22 is cylindrical. Instead of stud 22 in this case the medial portion 7 is formed tapering towards the outer flange 8 since tire or cover 15 and especially a metal rim 25 of the tire assembly joins the valve body beneath shoulder 8 so that it is here that close fitting is desirable. Rim 25 and tire 15 serve also as a combined reinforcement within recess 10. The first of them is rigid and is mainly adapted to take up deforming forces and thereby to relieve the valve body proper therefrom. The second one, however, is elastic and may be used for executing an additional sealing force by contraction, as has been described above. Inner flange 9 of the valve has a flanged stud 26 made integral therewith. A groove 27 between inner flange 9 and flange 28 of stud 26 is adapted to receive the edge of perforation 16 of bladder 14. If perforation 16 is of a diameter normally smaller than the normal diameter of the bottom of groove 27, an additional sealing effect will be achieved by the transversal contraction of perforation 16, as has been described above.

Within stud 26 the air channel is constituted by a flat continuation 29 of lower slit 13 of constant cross section similar to that of upper slit 12 of the present and the previous embodiment. It can be seen from the drawing that the pointlike passage of the valve lies at the level of metal rim 25, i. e. of the greatest resistance of surrounding construction parts and materials. Thus the rubber material of the valve proper in this cross section is practically relieved from transversal tensile strains.

The assembly of the tire will be carried out in the following manner:

The bladder 14 is stretched so as to pass the edge of perforation 16 over flange 28 and to let it snap into groove 27. In this interlocking position flange 9 and bladder 14 will be attached to each other by cementing or vulcanising. Then bladder 14 is accommodated within tire 15 and this is placed on rim 25 in the usual manner. Stud 22, which serves as a valve stem, will be pulled through perforation 17 of tire 15 and through a perforation 30 of rim 25 known per se which has been brought into a registering position with perforation 17 as it is well known in the art. The pulling through of the valve stem has substantially been facilitated by the reduced diameter of flange or shoulder 8 and by its rounded profile. Flanges 8 and 9 firmly hold the valve in its proper position. However, at transversally acting forces valve stem or stud 22 can easily yield in their direction without endangering the joint of valve and bladder which is often the case with tire assemblies comprising metal construction parts, especially metal valve stems. Even if the latter will not be torn out of bladder 14, deformations easily occur and destroy the metal parts of construction whereby the whole tire assembly is rendered waste.

Inflating and deflating takes place as has been described with reference to the first embodiment illustrated.

Modifications of the valve without departing from the spirit of this invention have been described above and will be apparent upon considering the means of the invention but these are believed to be included within its scope.

What is claimed is:

1. A pneumatic valve constituted by an integral body of resilient material having a longitudinal central portion and a pair of flanges formed at opposite ends of said central portion and defining a recess between them to receive a reinforcing member substantially circumferentially of said central portion, and a passage extending through said flanges and said central portion, said passage being defined by a pair of flat slits extending in intersecting planes, narrowing towards each other and meeting substantially at the meeting point of the adjacent apexes of the triangular conformations defining said slits.

2. A pneumatic valve for an inflatable member formed entirely of a resilient material as an integral body having a longitudinal medial portion, an outer flange and an inner flange provided at the ends of said medial portion, and forming a recess therewith for receiving a reinforcement, and a longitudinal air channel extending through said medial portion and said flanges and formed by two contiguous flat slits disposed in intersecting planes, said slits narrowing towards each other within said medial portion.

3. A pneumatic valve for an inflatable member formed entirely of a resilient material as an integral body having a longitudinal medial portion, an outer flange and an inner flange provided at the ends of said medial portion, and forming a recess therewith for receiving a reinforcement, and a longitudinal air channel extending through said medial portion and said flanges and formed by two flat slits disposed in intersecting planes, said slits narrowing towards and connecting with each other at a point within said medial portion.

4. A pneumatic valve for an inflatable member formed entirely of a resilient material as an integral body having a longitudinal medial portion, an outer flange and an inner flange provided at the ends of said medial portion, and forming a recess therewith, an annular reinforcement made of resistant material and accommodated within said recess, and a longitudinal air channel extending through said medial portion and said flanges and formed by two flat slits disposed in intersecting planes, said slits narrowing towards and connecting with each other at a point within said medial portion at the level of said annular reinforcement.

5. A pneumatic valve for an inflatable member formed entirely of a resilient material as an integral body having a longitudinal medial portion, an outer flange and an inner flange provided at the ends of said medial portion, and forming a recess therewith for receiving a reinforcement, said medial portion being formed tapering towards said outer flange, and a longitudinal air channel extending through said medial portion and said flanges and formed by two contiguous flat slits disposed in intersecting planes, said slits narrowing towards each other within said medial portion.

6. A pneumatic valve for an inflatable member formed entirely of a resilient material as an integral body having a longitudinal medial portion, an outer flange and an inner flange provided at the ends of said medial portion, and forming a recess therewith for receiving a reinforcement, a bulge formed integral with said inner flange for pressing against the adjacent part of said medial portion when inflation of said inflatable member takes place, and a longitudinal air channel extending through said medial portion, said flanges and said bulge and formed by two contiguous flat slits disposed in intersecting planes, said slits narrowing towards each other within said medial portion.

References Cited in the file of this patent

UNITED STATES PATENTS

| 1,932,226 | Pierce | Oct. 24, 1933 |
| 1,992,764 | Perry | Feb. 26, 1935 |
| 2,065,121 | DeLaney | Dec. 22, 1936 |
| 2,071,213 | Perry | Feb. 16, 1937 |
| 2,183,900 | Voit | Dec. 19, 1939 |
| 2,233,096 | Goldsmith | Feb. 25, 1941 |

FOREIGN PATENTS

| 27,019 | Great Britain | 1897 |
| 22,019 | Great Britain | 1907 |
| 9,393 | Great Britain | 1910 |
| 435,273 | Great Britain | 1935 |